United States Patent
As et al.

(10) Patent No.: US 10,770,962 B2
(45) Date of Patent: Sep. 8, 2020

(54) CONVERTER CELL COMPRISING AN ENERGY CONVERTER IN PARALLEL TO A CLAMP INDUCTOR

(71) Applicant: ABB SCHWEIZ AG, Baden (CH)

(72) Inventors: Aneeshkumar As, Ludvika (SE); Kalpesh Bhalodi, Chennai (IN); Tomas Jonsson, Norrköping (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/071,367

(22) PCT Filed: Apr. 8, 2016

(86) PCT No.: PCT/EP2016/057788
§ 371 (c)(1),
(2) Date: Jul. 19, 2018

(87) PCT Pub. No.: WO2017/174154
PCT Pub. Date: Oct. 12, 2017

(65) Prior Publication Data
US 2019/0341838 A1    Nov. 7, 2019

(51) Int. Cl.
*H02M 1/08*    (2006.01)
*H02M 3/158*    (2006.01)
*H02M 7/162*    (2006.01)

(52) U.S. Cl.
CPC .......... *H02M 1/08* (2013.01); *H02M 3/1584* (2013.01); *H02M 7/162* (2013.01)

(58) Field of Classification Search
CPC .................................................... H02M 1/08
See application file for complete search history.

(56) References Cited

U.S. PATENT DOCUMENTS

| 4,953,068 A * | 8/1990 | Henze ............... H02M 3/33584 363/127 |
| 2009/0146635 A1 * | 6/2009 | Qiu ....................... H02M 3/156 323/290 |
| 2009/0190379 A1 | 7/2009 | Melanson et al. |

(Continued)

FOREIGN PATENT DOCUMENTS

| CN | 101630901 A | 1/2010 |
| CN | 104578794 A | 4/2015 |

(Continued)

OTHER PUBLICATIONS

International Preliminary Report on Patentability, issued in PCT/EP2016/057788, dated Apr. 23, 2018.

(Continued)

*Primary Examiner* — Jue Zhang
*Assistant Examiner* — Trinh Q Dang
(74) *Attorney, Agent, or Firm* — Slater Matsil, LLP

(57) ABSTRACT

A converter cell includes a first terminal; a second terminal; a plurality of switching elements provided with respective gate units; an energy storage element; an clamp inductor provided to restrict a rate of change of current from the energy storage element to the switching elements; and a first energy converter provided in parallel to the clamp inductor. The first energy converter is provided to power the gate units by utilising energy from the clamp inductor when the converter cell changes state to be in a short circuit state.

20 Claims, 4 Drawing Sheets

(56) References Cited

U.S. PATENT DOCUMENTS

| | | | | |
|---|---|---|---|---|
| 2014/0268956 A1* | 9/2014 | Teren | ................... | H02M 7/219 363/89 |
| 2015/0117068 A1 | 4/2015 | Yin et al. | | |
| 2015/0131343 A1* | 5/2015 | Hufnagel | ................ | H02M 1/42 363/49 |
| 2017/0170658 A1* | 6/2017 | Tengner | ................ | H02J 3/1857 |

FOREIGN PATENT DOCUMENTS

| | | |
|---|---|---|
| CN | 204290718 U | 4/2015 |
| CN | 204304810 U | 4/2015 |
| EP | 0 070 158 A2 | 1/1983 |
| EP | 0 701 326 A2 | 3/1996 |
| EP | 2 913 925 A1 | 9/2015 |

OTHER PUBLICATIONS

International Search Report, issued in PCT/EP20161057788, dated Dec. 8, 2016.
Modeer et al., "High-Voltage Tapped-Inductor Buck Converter Auxiliary Power Supply for Cascaded Converter Submodules", Energy Conversion Congress and Exposition (ECCE), 2012 IEEE, Sep. 15, 2012, XP032467242, pp. 19-25.
Written Opinion of the International Searching Authority, issued in PCT/EP2016/057788, dated Dec. 8, 2016.
Chinese Office Action and Search Report, dated Mar. 20, 2019, for Chinese Application No. 201680084431.8, with English translations.
Modeer et al., "High-Voltage Tapped-Inductor Buck Converter Auxiliary Power Supply for Cascaded Converter Submodules," 2012 IEEE Energy Conversion Congress and Exposition (ECCE), 2012 (Nov. 12, 2012), pp. 19-25.

* cited by examiner

US 10,770,962 B2

CONVERTER CELL COMPRISING AN ENERGY CONVERTER IN PARALLEL TO A CLAMP INDUCTOR

TECHNICAL FIELD

The invention relates to a converter cell and associated multilevel AC/DC (Alternating Current/Direct Current) converter comprising an energy converter which utilises power in a clamp inductor, to thereby power gate units for switching elements.

BACKGROUND

High voltage power conversion between DC and AC are known in the art for a variety of different applications. One such application is related to HVDC (High Voltage DC).

The concept Modular Multilevel Converter (M2C) denotes a class of Voltage Source Converter (VSC). The M2C comprises a number of converter cells, each comprising switching elements and an energy storage element.

Various types of switching elements can be used, including various types of transistors such as IGBTs (insulated-gate bipolar transistors) and various types of thyristors such as IGCTs (Integrated Gate-Commutated Thyristors). Gate units are provided to control the switching of the switching elements. However, the gate units consume power, which can be significant depending on the type of switching element used.

In the prior art, power electronic converters are used to transform DC power from the converter cell to a DC power suitable for powering the gate units. Such a power electronic converter should transform the voltage from kilo-volts (e.g. 2.6 kV) to a voltage suitable for gate units, e.g. 36V. The power converter with very low gain has very low duty ratio and the peak current through the switching elements may also be one of the limiting factor. Hence, designing such a very low gain DC-DC converter with high power requirement is challenging.

SUMMARY

It is an object to provide an efficient way of powering gate units of a converter cell.

According to a first aspect, it is presented a converter cell comprising: a first terminal; a second terminal; a plurality of switching element provided with respective gate units; an energy storage element; an clamp inductor provided to restrict a rate of change of current from the energy storage element to the switching elements; and a first energy converter provided in parallel to the clamp inductor, the first energy converter being provided to power the gate units by utilising energy from the clamp inductor when the converter cell changes state to be in a short circuit state. By using the clamp inductor energy, the gate units (and optionally additional cell electronics) can be powered in normal operational mode without needing a very low gain DC-DC converter.

The converter cell may further comprise a second energy converter, the second energy converter being a DC, direct current, to DC converter configured to power the gate units using energy from the energy storage element when the first energy converter provides insufficient power for powering the gate units. This allows the gate units (and optionally other cell electronics) to be powered when the average current through the converter cell is very low. In such situations, the clamp inductor might not have sufficient energy to power the gate units and other cell electronics.

The second energy converter may be a bidirectional DC to DC converter. In this way, excess energy from the clamping inductor (which is not required for powering the gate units and cell electronics) can be utilised in charging the energy storage element.

The second energy converter may be a buck converter.

The first energy converter may be a DC to DC converter.

The switching element may be an integrated gate-commutated thyristor, IGCT.

A component string may be provided in parallel with the clamp inductor, the component string comprises a diode and a converter capacitor, wherein the first energy converter is provided in parallel to the converter capacitor.

The second energy converter may be provided in parallel to a serial connection of the energy storage element and the clamp inductor.

The converter cell may be a four quadrant converter.

The converter cell may be a full bridge cell.

The converter cell may be a two quadrant converter.

The converter cell may be a half bridge cell.

According to a second aspect, it is provided a multilevel AC/DC converter comprising a plurality of converter cells according to any one of the preceding claims.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on the realisation that energy in a clamp inductor can be used to power gate units of a converter cell, e.g. of a modular multilevel AC/DC converter, also known as a modular multilevel converter (M2C) 50.

Figure 1:
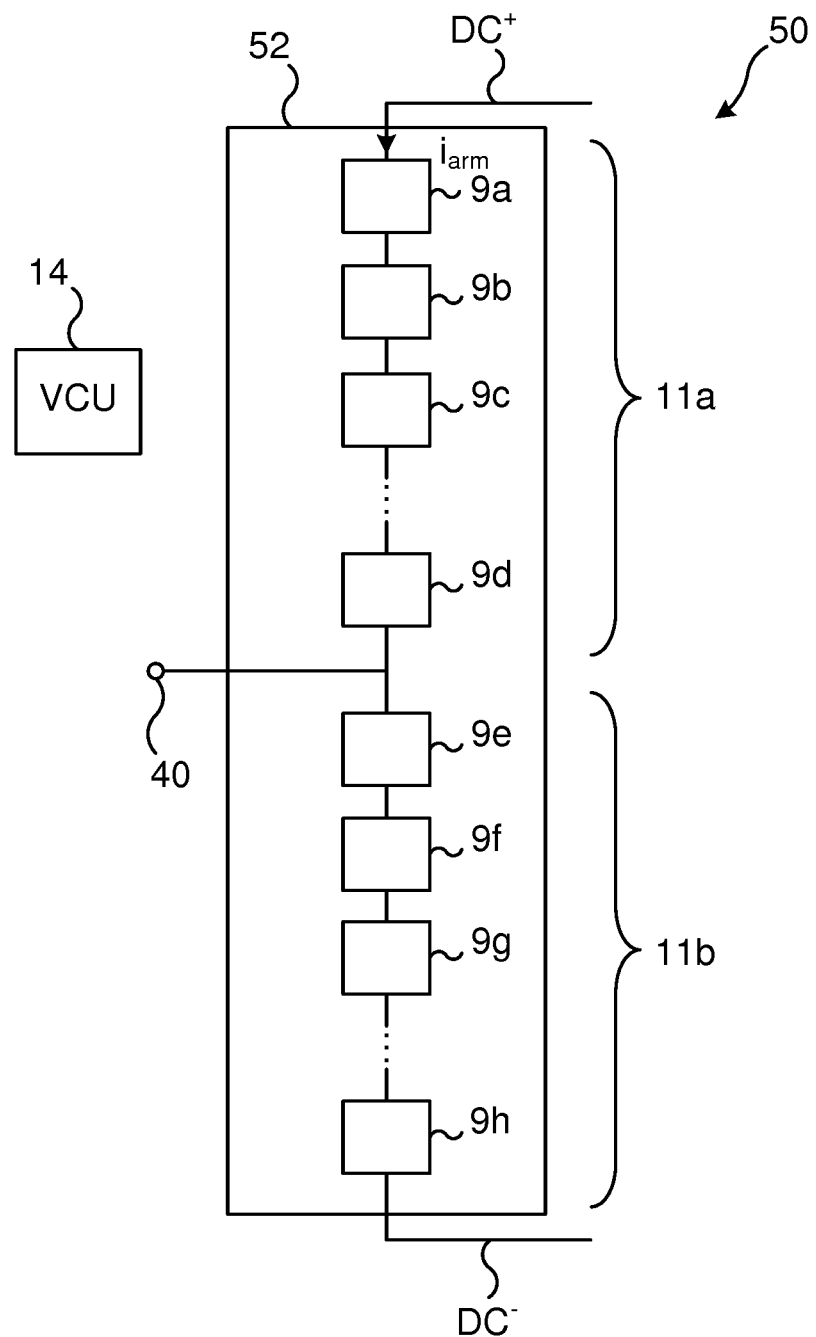
FIG. 1 is a schematic diagrams illustrating an environment where embodiments of the present invention can be applied.

The M2C 50 comprises one bridge leg for each phase. FIG. 1 illustrates one such bridge leg 52. Additional phases (such as for a three phase system) are configured in the same way. DC power is provided using a positive DC bus DC+ and a negative DC bus DC−. A valve control unit (VCU) 14 is connected to a plurality of converter cells 9a-h (connections between the VCU and the converter cells are not shown for clarity reasons). Arm inductors are omitted from this diagram for reasons of clarity.

An upper arm 11a of the bridge leg comprises a first set of converter cells 9a-9d, and a lower arm 11b of the bridge leg comprises a second set of converter cells 9e-h. All converter cells 9a-9h are controlled by control signal from the VCU 14. This allows the VCU 14 to e.g. effect pulse width modulation (PWM) to provide an alternating current to an AC terminal 40. By placing several converter cells 9a-d, 9e-h in series, high voltage applications can be supported. Moreover, the switching frequency of each converter cell can be reduced, thus reducing switching losses. It is to be noted that the number of converter cells shown here is only an example and any suitable number of converter cells can be used. The current through the upper arm is denoted $i_{arm}$. Since the converter cells 9a-d of the upper arm are connected serially, the current $i_{arm}$ passes through each one of the converter cells 9a-d of the upper arm. The same is true for the lower arm, but the arm currents may differ between the lower arm and the upper arm.

Figure 2:
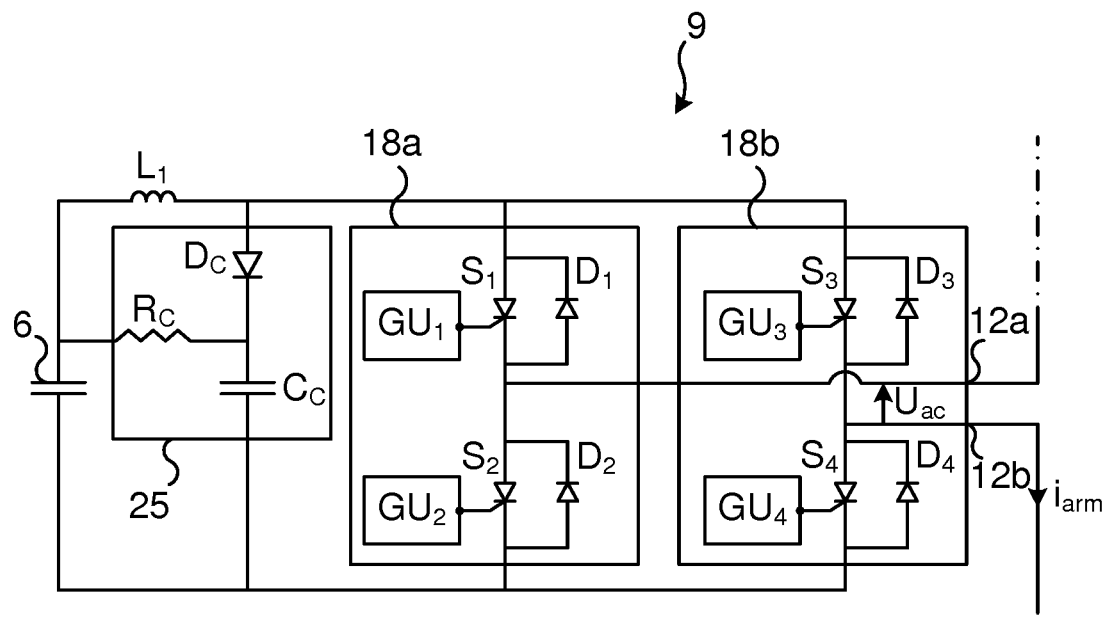
FIG. 2 is a schematic diagram illustrating an example of any one of the converter cells of FIG. 1, here represented by a single converter cell.

FIG. 2 is a schematic diagram illustrating an example of any one of the converter cells of FIG. 1, here represented by a single converter cell 9. The converter cell 9 here is a four quadrant converter cell in the form of a full bridge structure. The converter cell is connected using a first terminal 12a and a second terminal 12b, e.g. in a cascaded fashion as shown in FIG. 1.

The converter cell 9 here comprises four switching elements S1-S4, e.g. in the form of Integrated Gate-Commutated Thyristor (IGCT), Insulated Gate Bipolar Transistor (IGBT), Gate Turn-Off thyristor (GTO), or any other suitable high power semiconductor. A respective antiparallel diode D1-D4 is connected across each one of the switching elements S1-S4. An energy storage element 6, such as a capacitor, supercapacitor, etc., is also provided in parallel (via a clamp inductor L1), across a first leg of two switching elements S1-S2 and a second leg of two switching elements S3-S4. The full bridge structure allows the synthesis of a voltage, from the energy storage element 6, capable of assuming both signs, whereby the voltage of the converter cell 9 can either be zero, the voltage of the energy storage element 6, or a reversed voltage of the energy storage element 6.

The switching elements S11-S4 each have a respective gate unit GU1-GU4. Each gate unit GU1-GU4 provides a suitable signal to the respective switching element based on a control signal provided to the gate unit from a controller such as the VCU 14 of FIG. 1, via a control board (not shown). However, the gate units consume power, which can be significant depending on the type of switching element used. In the examples shown below, the switching elements S1-S4 are exemplified with IGCTs; however, any suitable type of switching element can be employed.

The clamp inductor L1 is provided on one side of the energy storage element 6 to control the rate of change of current through the switching elements S1-S4. When the converter cell 9 is set in a zero voltage contribution mode (turn-off), the energy stored in the clamp inductor L1 needs to be clamped in order to avoid high voltage overshoot across the switching elements S1-S4. Thus an RC snubber 25 is used to clamp this voltage. The RC snubber 25 comprises a snubber resistor Rc, a snubber capacitor Cc and a snubber diode Dc (which can also be considered to be provided outside the RC snubber 25). In this way, the energy stored in the clamp inductor L1 gets dissipated in the clamp resistor Rc when needed, e.g. during turn-off.

The clamping energy depends on the current at which the cell is switching and there by the operating point of the entire converter comprising the converter cell 9. As presented in more detail below, in embodiments presented herein, the energy stored in the clamp inductor is used to power cell electronics of the converter cell 9, including the gate unit GU1-GU4.

This is feasible since the power required by the gate units increases with the switching current and the energy stored in the clamp inductor also increases with increased switching current.

Figure 3:
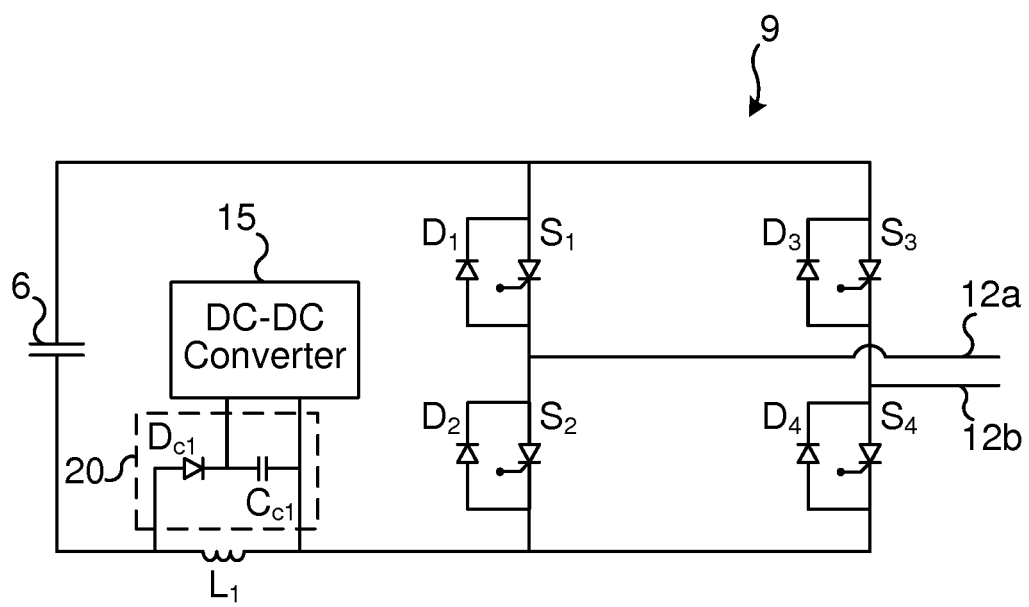
FIG. 3 is a schematic diagram illustrating an example of any one of the converter cells of FIG. 1, here represented by a single converter cell where clamp inductor energy is used to power gate units.

FIG. 3 is a schematic diagram illustrating an example of any one of the converter cells of FIG. 1, here represented by a single converter cell where clamp inductor energy is used to power the gate units.

Here, a component string 20 is provided in parallel to the clamp inductor L1. The component string 20 comprises a diode Dc1 and a converter capacitor Cc1. Furthermore, a first energy converter 15 is provided in parallel to the converter capacitor Cc1. The first energy converter 15 is a DC/DC converter which used to provide DC power of suitable voltage to the gate units (not shown for clarity reasons) for each one of the switching elements S1-S4. The first energy converter 15 can also be used to power other components of the converter cell 9 not shown here such as a controller board.

The IGCT has a high power requirement (about 115 W) for its gate unit and the required power depends on the switching frequency as well as the switching current of the IGCT. The power loss in the gate unit has a fixed loss part and loss part which varies with switching current as well as frequency. The fixed power loss in the gate unit is less than 20 W.

In case of an IGCT based MMC configuration, in one example, the power required for the cell electronics is approximately 460 W during normal operation. In comparison, when IGBTs are used, the total cell electronics power requirement is approximately 30 W, i.e. less than 10% of IGCT cell power supply requirement.

The power requirement of the gate unit and of the whole converter cell will now be analysed in some more detail. The gate unit power loss has four main parts: logic losses, back-porch current losses, turn ON losses and turn OFF losses. The logic circuit losses are constant and independent of switching frequency and arm current. The back-porch losses are related to the back porch current supplied by the gate unit during the IGCT turn ON period and depend on the duty ratio of the IGCT operation. The turn ON losses mainly depends on the switching frequency of the IGCT. Finally, the turn OFF loss of the gate unit depends on the switching frequency as well as turn OFF current and the turn OFF losses of the gate unit is approximately 80% of the total losses in the gate unit. Hence, the power required by the gate unit is highly dependent on the switching frequency and operating region of the converter. The variation of power required for the gate unit varies linearly with the average valve current and only 19 W is required when the valve is operating at no-load.

Figure 4:
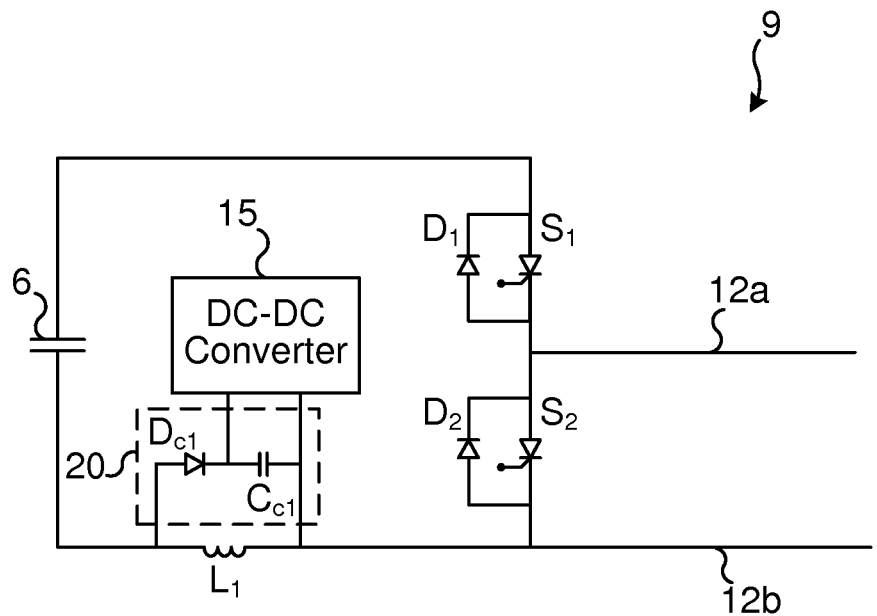
FIG. 4 is a schematic diagram illustrating a half bridge version of the converter cell of FIG. 3.

FIG. 4 is a schematic diagram illustrating a half bridge version of the converter cell of FIG. 3. The first energy converter 15 can also be applied in this type of converter cell. As known in the art of cells, a two quadrant converter cell, such as the one of FIG. 3, can provide a voltage which can either be zero or the voltage of the energy storage element 6.

Figure 5:
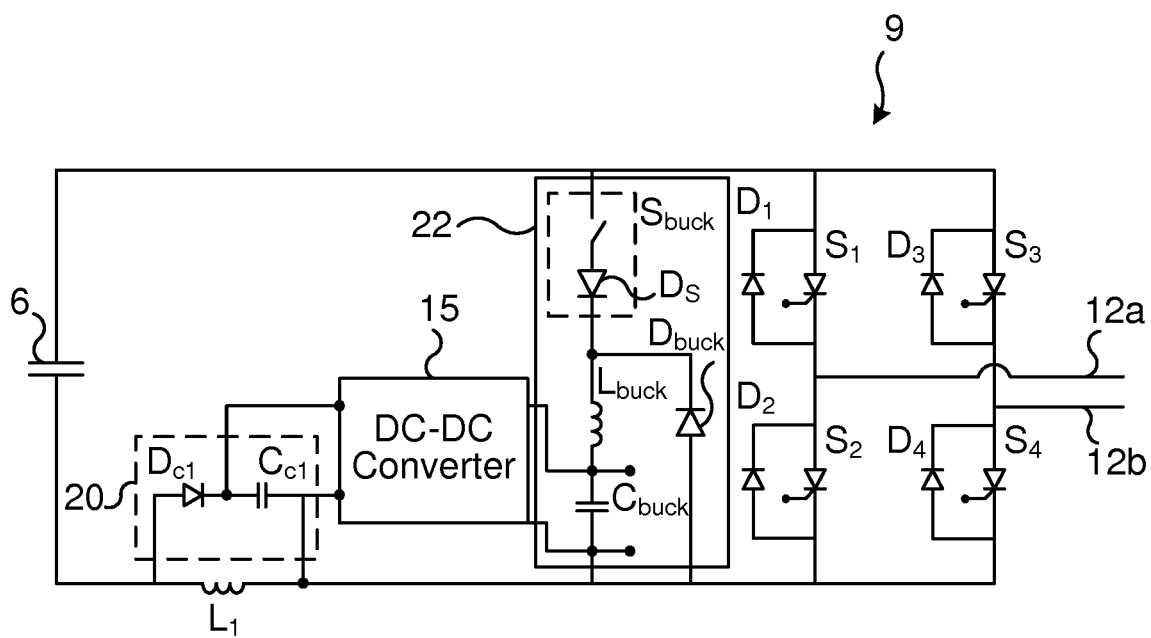
FIG. 5 is a schematic diagram illustrating a converter cell similar to the converter cell of FIG. 3, but also comprising a buck converter.

Looking now to FIG. 5, this is a schematic diagram illustrating a converter cell similar to the converter cell of FIG. 3, but also comprising a second energy converter 22.

During no-load operation of the converter or during energization, the switching current will be zero or very small and the energy produced by the clamp inductor may not be sufficient to power the gate unit. By using an additional power electronic converter, a second energy converter, this situation can also be handled.

The second energy converter 22 is provided in parallel to the energy storage element 6 (in serial connection with the clamp inductor L1) to thereby use part of the energy of the energy storage element to provide power to the first energy converter 15. In this example, the second energy converter is implemented using a buck converter 22 comprising a buck switch Sbuck with an optional switching diode Ds, a buck inductor Lbuck, a buck capacitor Cbuck and a buck diode Dbuck. The first energy converter 15 is provided across the buck capacitor Cbuck.

As explained above, power requirements at no-load is very small, but still needs to be addressed. An approximate power calculation shows that the additional power supply may need approximately 90 W capacity and the rest of the energy required for the GU will be derived from the clamp inductor as explained above. In comparison, when conventional design is employed the power converter needs to provide approximately 460 W for the entire converter cell.

In this example, the buck converter 22 is rated for the power required by the cell electronics when the valve average operating current is less than 100 A which is approximately 90 W. When the converter cell 9 is operating above 100 A average current, then the buck converter 22 can be inactive and energy from the clamp inductor L1 is sufficient to supply the cell electronics. During normal operation, the average current will typically be sufficiently high so that the buck converter does not need to be active. Hence, the buck converter 22 only needs to be active during the energization and de-energization of the converter. This can be effected by appropriate control of the buck switch Sbuck, i.e. inactivating the entire buck converter 22 by setting the buck switch Sbuck in a non-conducting state.

Figure 6:
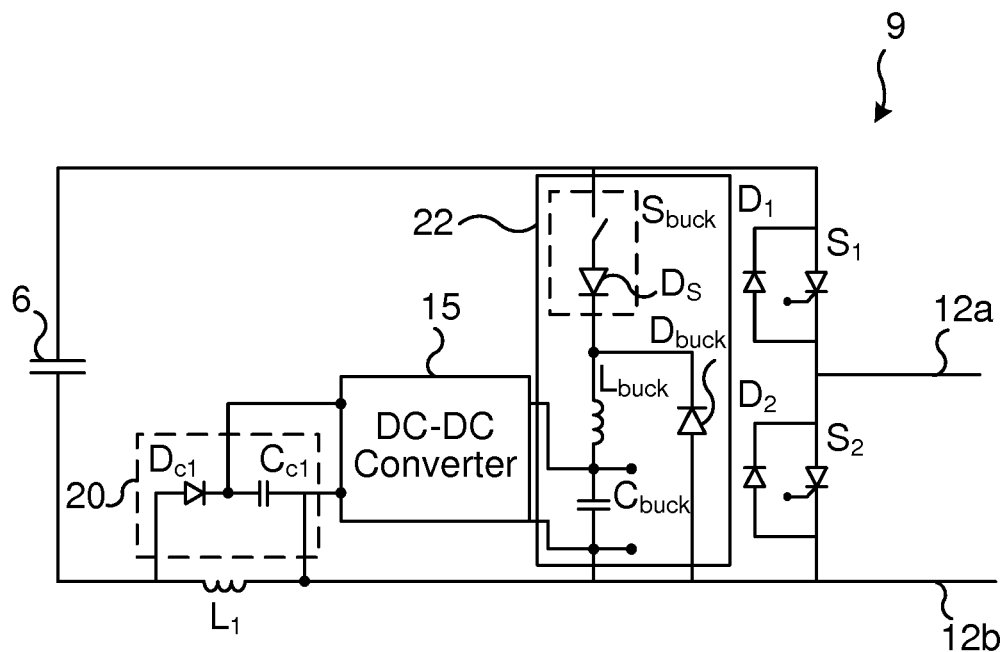
FIG. 6 is a schematic diagram illustrating a half bridge version of the converter cell of FIG. 5.

FIG. 6 is a schematic diagram illustrating a half bridge version of the converter cell of FIG. 5.

Figure 7:
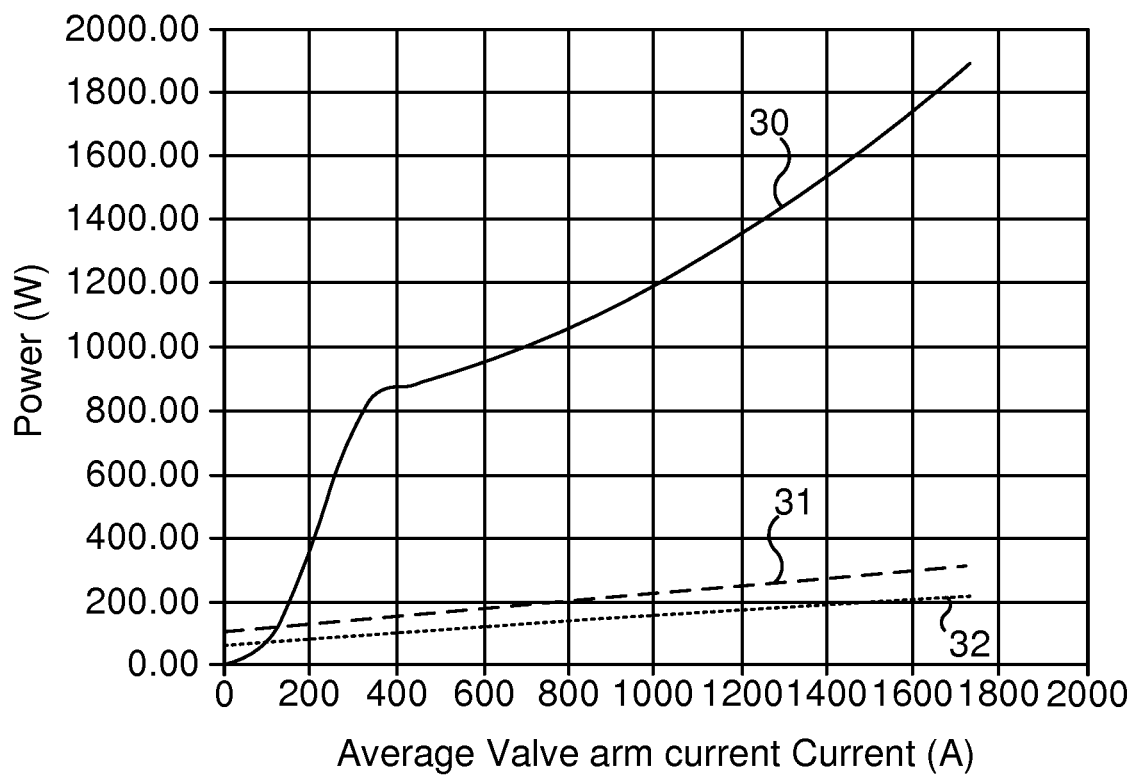
FIG. 7 is a schematic graph illustrating power aspects of the converter cells of FIG. 1.

FIG. 7 is a schematic graph illustrating power aspects of the converter cells of FIG. 1. The horizontal axis represents average arm current (A) and the vertical axis represents power (W).

The solid line 30 shows power supplied by the clamp inductor. The dotted line 32 shows power consumption for the gate units of the converter cell. The dashed line shows power consumption in the converter cell including inefficiency factors.

From the graph, it is seen that from about 90 A, the power provided by the clamp inductor is sufficient to power the converter cell and the buck converter can be inactive above this operating point. In one embodiment, the second energy converter is instead implemented using a bi-directional DC-DC converter, allowing excess energy from the clamp inductor to be fed back to the cell capacitor. When the converter cell 9 is operating above 90 A average current, then the energy from the clamp inductor L1 is sufficient to supply the cell electronics, at which point the bi-directional DC-DC converter can be operated in reverse power mode, whereby the bi-directional DC-DC converter can feed the extra energy back to the cell capacitor. During normal operation, the average current will typically be sufficiently high so that the bi-directional DC-DC converter is operated in reverse power mode. Hence, the bi-directional DC-DC converter is operated as forward power mode during the energization and de-energization of the converter and reverse power mode during the normal operation, i.e. when the converter cell 9 is operating above 90 A average current. This can be effected by appropriate control of the switch in the bi-directional DC-DC converter.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A modular multilevel converter cell comprising:
a first terminal;
a second terminal;
a plurality of switching elements provided with respective gate units;
an energy storage element;
a clamp inductor in a serial connection with the energy storage element,
wherein the energy storage element is provided in parallel, via said clamp inductor, across a first leg of two switching elements, thereby the clamp inductor is configured to restrict a rate of change of current from the energy storage element to the switching elements; and
a first energy converter in the form of a DC, direct current, to DC converter provided in parallel to the clamp inductor, the first energy converter being configured to power the gate units by utilising energy from the clamp inductor when the converter cell changes state to be in a short circuit state.

2. The converter cell according to claim 1, the converter cell further comprises a second energy converter, the second energy converter being a DC to DC converter configured to power the gate units using energy from the energy storage element when the first energy converter provides insufficient power for powering the gate units.

3. The converter cell according to claim 1, wherein each switching element is an integrated gate-commutated thyristor, IGCT.

4. The converter cell according to claim 1, wherein a component string is provided in parallel with the clamp inductor, the component string comprising a diode and a converter capacitor, wherein the first energy converter is provided in parallel to the converter capacitor.

5. The converter cell according to claim 1, wherein the converter cell is a four quadrant converter.

6. The converter cell according to claim 1, wherein the converter cell is a two quadrant converter.

7. A multilevel AC/DC, alternating current/DC, converter comprising a plurality of converter cells according to claim 1.

8. The converter cell according to claim 2, wherein the second energy converter is a bidirectional DC to DC converter.

9. The converter cell according to claim 2, wherein the second energy converter is a buck converter.

10. The converter cell according to claim 2, wherein each switching element is an integrated gate-commutated thyristor, IGCT.

11. The converter cell according to claim 2, wherein a component string is provided in parallel with the clamp inductor, the component string comprising a diode and a converter capacitor, wherein the first energy converter is provided in parallel to the converter capacitor.

12. The converter cell according to claim 2, wherein the converter cell is a four quadrant converter.

13. The converter cell according to claim 3, wherein a component string is provided in parallel with the clamp inductor, the component string comprising a diode and a converter capacitor, wherein the first energy converter is provided in parallel to the converter capacitor.

14. The converter cell according to claim 4, the converter cell further comprises a second energy converter, the second energy converter being a DC to DC converter configured to power the gate units using energy from the energy storage element when the first energy converter provides insufficient power for powering the gate units, and wherein the second energy converter is provided in parallel to the serial connection of the energy storage element and the clamp inductor.

15. The converter cell according to claim 5, wherein the converter cell is a full bridge cell.

16. The converter cell according to claim 6, wherein the converter cell is a half bridge cell.

17. The converter cell according to claim 8, wherein each switching element is an integrated gate-commutated thyristor, IGCT.

18. The converter cell according to claim 8, wherein a component string is provided in parallel with the clamp inductor, the component string comprising a diode and a converter capacitor, wherein the first energy converter is provided in parallel to the converter capacitor.

19. The converter cell according to claim 9, wherein each switching element is an integrated gate-commutated thyristor, IGCT.

20. The converter cell according to claim 9, wherein a component string is provided in parallel with the clamp inductor, the component string comprising a diode and a converter capacitor, wherein the first energy converter is provided in parallel to the converter capacitor.

* * * * *